US005601681A

United States Patent [19]

Bayro

[11] Patent Number: 5,601,681

[45] Date of Patent: Feb. 11, 1997

[54] METHOD OF CONSTRUCTION OF MULTIPURPOSE CARDCARRIER OR MENU

[76] Inventor: Edward L. Bayro, 208 Winnsboro Ct. Suite D, Schaumberg, Ill. 60193

[21] Appl. No.: 265,398

[22] Filed: Jun. 24, 1994

[51] Int. Cl.[6] ..................... B32B 31/18; B32B 31/12

[52] U.S. Cl. .................... 156/268; 156/250; 156/252; 156/277; 156/278; 156/291; 156/327; 150/147

[58] Field of Search .................... 150/147; 40/124.2, 40/124.4, 359; 206/45.28, 44 B, 214, 425; 493/926, 944; 281/31; 156/257, 268, 277, 291

[56] References Cited

U.S. PATENT DOCUMENTS

| | | | |
|---|---|---|---|
| D. 271,919 | 12/1983 | Duffy | D3/74 |
| D. 325,393 | 4/1992 | Schertz et al. | D19/26 |
| D. 335,028 | 4/1993 | Berlin | D3/56 |
| D. 337,610 | 7/1993 | Mixon | D19/26 |
| D. 343,514 | 1/1994 | Underwood, Jr. | D3/40 |
| 1,545,577 | 7/1925 | Arms . | |
| 1,683,996 | 9/1928 | Snow | 150/147 |
| 2,226,976 | 12/1940 | Leaming | 206/425 X |
| 2,431,472 | 11/1947 | Fistell | 150/39 |
| 2,732,874 | 1/1956 | Carstensen | 150/39 |
| 2,732,875 | 1/1956 | Martin | 150/39 |
| 2,879,774 | 3/1959 | Siegel | 129/20 |
| 3,368,600 | 2/1968 | Coniker | 150/147 |
| 3,565,148 | 2/1971 | Miller | 150/39 |
| 3,722,564 | 3/1973 | Croon | 40/124.2 X |
| 3,759,305 | 9/1973 | McIntyre . | |
| 3,816,948 | 6/1974 | Mooney et al. | 40/124.2 X |
| 3,850,083 | 11/1974 | Falcon | 156/257 X |
| 4,301,962 | 11/1981 | Monckton et al. | 40/124.2 X |
| 4,312,393 | 1/1982 | Green | 40/124.2 X |
| 4,419,837 | 12/1983 | Meeker | 281/31 X |
| 4,571,867 | 2/1986 | Williams | 40/124.4 X |
| 4,716,948 | 1/1988 | Brissette | 150/147 X |
| 4,832,372 | 5/1989 | Young | 281/31 |
| 4,974,983 | 12/1990 | Givati | 402/80 R |
| 5,119,574 | 6/1992 | King | 40/537 |
| 5,184,658 | 2/1993 | Baumann | 150/147 |
| 5,294,208 | 3/1994 | Tremmel, Jr. et al. | 402/70 |
| 5,308,308 | 5/1994 | Baumann | 493/199 |

*Primary Examiner*—David A. Simmons
*Assistant Examiner*—M. Curtis Mayes
*Attorney, Agent, or Firm*—Adrienne B. Naumann

[57] ABSTRACT

A folder for carrying business cards and the like, and a method for inexpensively producing the card carrier is described herein. A paperboard folder, which can open and close along a spine, is coated or otherwise designed along its outer surface. A sheet of plastic or other suitable material is next printed on its lower surface with adhesive stripes. This printed sheet is applied to the interior surface of the folder, where it is die-cut to produce the slots for inserting the cards. In this manner, a consumer can easily and quickly arrange his business cards in an inexpensive manner. The folder also comes with an elastic band which binds other papers to the card carrier's exterior surface. My invention is also easily adapted as a leaf or leaves in a restaurant menu, in which the pockets with slots easily hold removable cards printed with special entrees.

5 Claims, 6 Drawing Sheets

METHOD OF CONSTRUCTION OF MULTIPURPOSE CARDCARRIER OR MENU

BACKGROUND OF THE INVENTION

The present invention relates to a business card portfolio and a second embodiment as a menu folder. More particularly, the present invention relates to a plastic and paperboard folder which may be proportioned to function as a business card carrier or a restaurant menu.

There has been a long-standing need in the advertising and trade show industries for a convenient inexpensive portfolio to carry business cards and the like collected at such shows. Yet, they must be of sufficient versatility so that any entrepreneur, restaurateur, or businessman can have the front and back covers of the folders embossed, decorated, or lithographed to his or her liking. There are constraints of weight, cost, and rigidity of existing card holders menus which cannot be easily carried, used, or arranged in the harried world of trade shows. Moreover, restaurant menus cannot easily adapt changing "food specials" at the need of restaurateurs.

In the past others have suggested numerous arrangements for carrying cards or other flat articles on one's person. For instance, an obvious choice might be to simply construct a completely rigid card carrying folder with double layers of plastic to form pockets to carry, for example, credit cards. In fact, other devices have used a more elaborate approach than the present invention ever requires. For example, U.S. Pat. No. 1,545,577 (Arms) discloses a pocket case with clear "windows" of "celluloid" sheets secured in a binding which is stitched to a cover on three sides, with one side open for the introduction of the card, photograph, sample, or other article.

U.S. Pat. No. 2,431,472 (Fistell) discloses a folding holder wherein transparent sheets may be stitched directly to the material of a back portion for insertion of the document between the sheets and the back portion. U.S. Pat. No. 2,732,874 (Carstensen) discloses a folding data case with transparent pockets, a first transparent sheet material being unattached on one side to provide entrances into the respective pockets. Carstensen also discloses extended seams formed by heat bonding portions of second sheets to the first sheet to form a plurality of pockets.

U.S. Pat. No. 2,879,774 (Siegel) discloses an album for photographic slides. It is made of pasteboard, with a first sheet containing cut-out portions, and a second thin flexible second sheet superimposed on the upper surface of the pasteboard. U.S. Pat. No. 3,565,148 (Miller)discloses a wallet formed from three panels of thin flexible material to provide two rows of pockets separated by a longitudinal fold line.

U.S. Pat. No. 4,832,372 (Young) discloses a portfolio with an a serial array of card-receiving pockets on a foldable panels. The card-receiving pockets open towards a central hinge line when a panel is folded away from the first cover of the portfolio. U.S. Pat. No. 2,732,875 (Martin) discloses a pocket secretary with a card carrying attachment made of a first sheet of transparent plastic material. This first sheet is heat welded to a second pair of transparent plastic sheets along three edges.

U.S. Pat. No. 4,974,983 (Givati) discloses a card holder in which the pockets are actually sleeves for holding cards in a back-to-back configuration. U.S. Pat. No. 5,119,574 (King) discloses a collector's album having transparent display pages. There are rectangular pockets to receive display items, each pocket generally having a planar transparent recessed base surface bounded by a peripheral retaining wall.

U.S. Pat. No. 5,294,208 (Tremmel Jr. et. al) discloses a notebook-type personal organizer. It contains at least one panel with an inside surface, and a pocket of flexible material formed on one of the inside surfaces of each panel.

In U.S. Pat. No. 5,184,658 (Baumann) describes a method of construction of a cardholder with pockets. In this method a sheet of nylon/vinyl is interwoven through the slits in a second sheet to form the desired pockets. In a subsequent patent by Baumann (U.S. Pat. No. 5,308,308) he describes a method of pocket construction in which the card display pocket is formed of three sheets of fusible material.

My invention is a necessity for every exhibitor and visitor to large modern trade shows. The purpose of these shows is to bring exhibitors and their products or services to the attention of the visitors. Typically every exhibitor's booth has stacks of literature and samples which are intended to go home with the visitors. Many of the exhibitors give away shopping bags to help the visitors carry away their loot. The bags are adorned with memorable and attractive art work and commercial messages. However, the bags fill up quickly and seem to devour business cards consigned to them. Any visitor also likes to somehow keep the business cards attached to the distributed fliers and data sheets. As contemporaneous records of face-to-face meetings, the customers deserve better.

My invention is generally produced in two sizes: (1) a large size based on 11" by 17" card stock, creased and folded to enclose letter-sized data sheets,and up to 20 standard 3.5" by 2" business cards; and (2) a smaller portfolio based on 8.5" by 14" or 8.5" by 11" card stock, to display 12 or eight cards respectively, and enclose letter-sized pages and correspondence. The front and back covers are lithographed with any colors desired. The interior back and front covers have a plastic sheet attached with rows of pressure sensitive adhesive, and containing slots in that sheet which define pockets to accept cards. The pattern of adhesive is laid down by an offset process. Additional graphics may be offset to the inside covers before the adhesive pattern is applied. A similar construction is possible for a restaurant menu in which one or more pages, or leaves, carry such slots for removable cards which advertise special entrees.

As can be seen, none of the above devices are constructed by overlying a sheet of plastic material with adhesive stripes, thereby keeping use of additional expensive materials and elaborate strengthening devices to a minimum. These earlier devices totally fail to supply a lightweight, convenient method of carrying a multitude of business cards. They also lack an extremely simple exterior means attached to a folder for holding other advertizing materials, as demonstrated in the preferred embodiment of my invention.

SUMMARY OF THE INVENTION

To solve this problem long-standing in the art, my present invention provides an improved card carrier by which the user can quickly insert a business, or similarly shaped card into a sturdy plastic pocket in a lightweight paperboard folder. My folder, which functions similarly to a modified lightweight notebook, can contain a plurality of cards. It can also be made to any size, depending upon how many card carrying compartments the user or manufacturer desires. Another embodiment of my invention comprises vinyl pockets for restaurant menus by using an additional page, or leaf, for food specials, which are printed on paper cards and placed in the menu pockets.

According, an object of my present invention is to provide an improved hand-held carrier for business or similarly shaped cards, which facilities their organization, retention, and collection.

Another object of my invention is to provide companies with a functional hand-out or giveaway specialty item that features a collection of business cards.

Still another object of my invention is to provide companies with a broader advertising space than ordinary and customary specialty items currently can provide.

Yet another object of my invention is to add convenience to collected data sheets, literature, brochures and flyers with a handle and band to keep the papers together when the folder is closed.

Another object of my invention is to give a company a uniquely different functional item to attract more customers.

Another object of my invention is to enable a company to provide a network of business cards for similar businesses frequented by many end-users in the same markets or services.

Another object enables the consumer end-users to retain neat and orderly collections of business cards, as well as other papers or literature associated with a commercial event.

Another object of the invention enables the combination of paperboard, plastic and adhesive stripes which reduce the cost from a similar item made entirely of plastic.

Another object of the invention is to allow the users to obtain greater advertising quality and coverage with the ability to print directly on the outside folder cover.

Another object of my invention is to provide a means to collect business cards, data sheets, and flyers in one folder. The user is not required to obtain a three ring binder to insert separate plastic card pockets.

Another object of my invention is to provide a means for restaurant menus to have a neater and more organized method of placing the "food specials" on a menu card collection.

Another object of my invention is to provide a means for restaurants to provide a uniquely different item to draw more customers.

Another object of my invention is to have a cost effective item, definitely different by nature of manufacture and materials, which is less expensive for the restaurateur to use in large potentially disposable quantities.

Another object of my invention is the selection of a window material in my menus, which substantially reduces the tendency of the windows to stick to the inserted cards as do clear vinyl ones. Moreover, using frosted vinyl greatly reduces the offsetting of the printing from inserted cards to the vinyl as is currently the case with clear vinyl sheets.

These and still other objects and advantages of my invention will become apparent from the following description of the preferred embodiment in view of the annexed drawings.

BRIEF DESCRIPTION OF THE DRAWINGS

My invention may be better understood by reference to the drawings accompanying this specification.

DETAILED DESCRIPTION OF THE INVENTION

Figure 1:
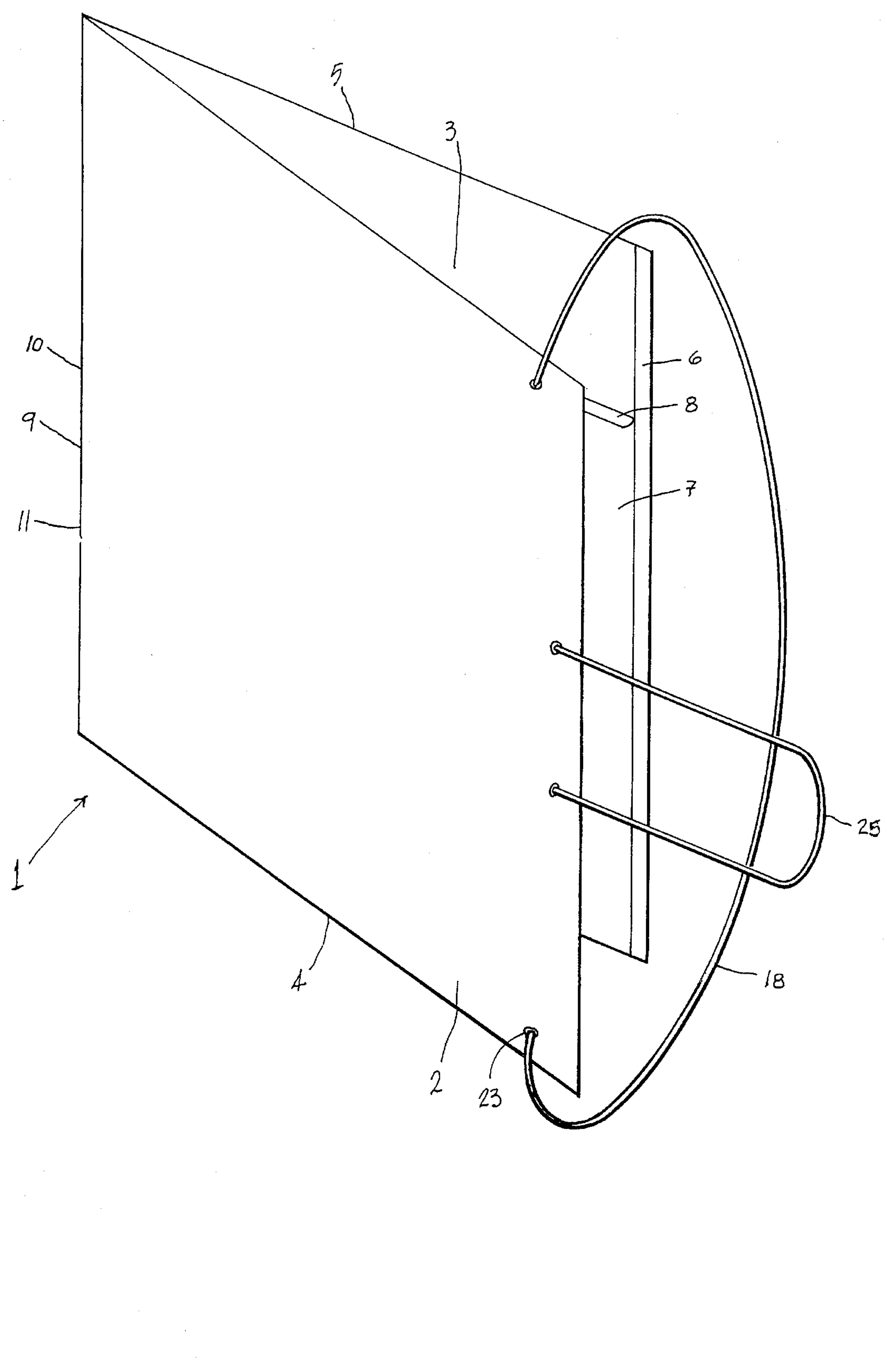
FIG. 1 is a partial front view of the card carrier with front and back paperboard leaves, thus forming a folder.

The present invention, hereafter referred to as the card carrier, is actually made of only a few inexpensive components: paperboard, a sheet of plastic or a similar material, and adhesive stripes. In the preferred embodiment, the plastic is frosted vinyl. Also in the preferred embodiment, the entire paperboard folder is encircled by an elastic band so that other pieces of paper can be carried together with the business cards. Such a band can also bind leaves of a menu together. Also in the preferred embodiment, there is a band which functions as a handle when attached to either side of the folder in a closed position.

In sum, in the embodiments comprising my invention of a card carrier, the preferred embodiment generally consists of a paperboard folder, creased medially so that covers, or leaves, are formed, and it may be quickly opened or closed. My preferred embodiment also comprises adhesive stripes applied on the lower surface of the frosted vinyl sheet opposing the inside covers. These materials are used to form as many business card compartments, or pockets, as the manufacturer desires, with respect to the plastic or other suitable sheet, size of the folder, and number and alignment of adhesive stripes on the plastic sheet. Consequently, an important commercial and functional advantage of my invention is that each paperboard folder can be custom made to the size and number of business card compartments when all cards are the same size.

In the preferred embodiment of my commercial card carrying folder, each of the two leaves of a folder is constructed of either 18 point or 24 point coated bleached white paperboard and 3.5 mil frosted calendar (uniform thickness) PVC (poly vinyl chloride) vinyl. Once the exterior surfaces of the front and back leaves, or covers of the folders have been lithographed or otherwise designed, the interior surfaces of both leaves, or covers, are overlaid with the vinyl sheet.

The stripes of adhesive, which are printed upon the lower surface of the plastic sheet prior to its lamination to the paperboard, are approximately ⅜" wide acrylic pressure sensitive, such as those of Sun Process (R) in Elk Grove Village, Ill. These adhesive stripes are printed or silkscreened onto the lower surface of the plastic sheet at various points and edges of that sheet. As one possible method, silkscreening is a familiar printing technique to those skilled in this particular art. The adhesive stripe pattern printed upon the lower surface of the sheet in this manner will determine the number of three-sided card containing pockets required for the customer's use.

Next, in the preferred embodiment, the 3.5 mil frosted vinyl sheets, after printing with the appropriate pattern of adhesive stripes, are placed smoothly over the interior surface of the folder. Die-cut slots are then made to form the openings in the vinyl sheet to form the openings to the pockets for the business cards. These die-cutting methods are well known by those skilled in this particular art. A scoring and hole punching operation, also well known to those in the art also occurs in the die-cutting stage to form the holes for the band and scoring for the folder's spine.

In the preferred embodiment the final step is attachment of the ⅛" diameter fiber-wrapped elastic band to link prepunched holes in the upper and lower corners of the folder. These holes are punched (1) 1 and ¼" from the right top and bottom corners of a completely open and flatly positioned folder; and (2) ¼" inward from the top and bottom width wise edges of these same corners.

In the preferred embodiment the adhesive used may be of the type known as SUN(R) obtainable from Sun Process Converting, Inc. of Elk Grove Village, Ill. Specifically, the adhesive is designated SP100 S permanent, is acrylate based, is screen printable, UVR (ultraviolet light resistant), and pressure sensitive. According to the manufacturer, this particular material displays very good adhesion to polyesters, polycarbonate, foils, glass, metal, electrically pretreated polyethylene, and polypropylene. Each stripe dries to films of approximately 2 millimeters in thickness, and has a temperature range stability of between approximately 22 degrees F. (−5 degrees C.) and 212 degrees F. (100 degrees C.).

This adhesive, when printed onto polyester film, exhibits good stability in lower alkyl alcohols and hot oils, as well as excellent stability in lower aliphatic hydrocarbons. The adhesive films so formed dry in five minutes at 100 degrees C. (212 degrees F.). However, other adhesives suitable for printing by the offset, or the silkscreening process are also within the scope of my invention if they exhibit good adhesive qualities with paperboard. Similar materials and construction methods are used for the restaurant menu embodiment of my invention, in which a particular page or leaf in the menu will contain pockets for the removable cards.

In FIG. 1, the entire paperboard folder is referred to at 1. The exterior surface 2 can be lithographed or similarly imprinted to a customer's taste. The interior surface 3 carries the card holding means, or pockets. The front cover 4 and back cover 5 are partially folded. In FIG. 1, when the interior surface 3 is partially exposed, one glimpses portions of adhesive stripe 6, as well as a die-cut portion of a vinyl sheet 7, thus forming a slot at 8. The medial creases 9,10 (not seen in FIG. 1) allow folder 1 to completely open and close. These same creases also define the front and back leaves to the folder, as well as a narrow spine 11. Prepunched holes 23 and a first flexible band 18 can also be seen from this view, as well as a second band which functions as handle 25 when the folder is in a closed position.

Figure 2A:
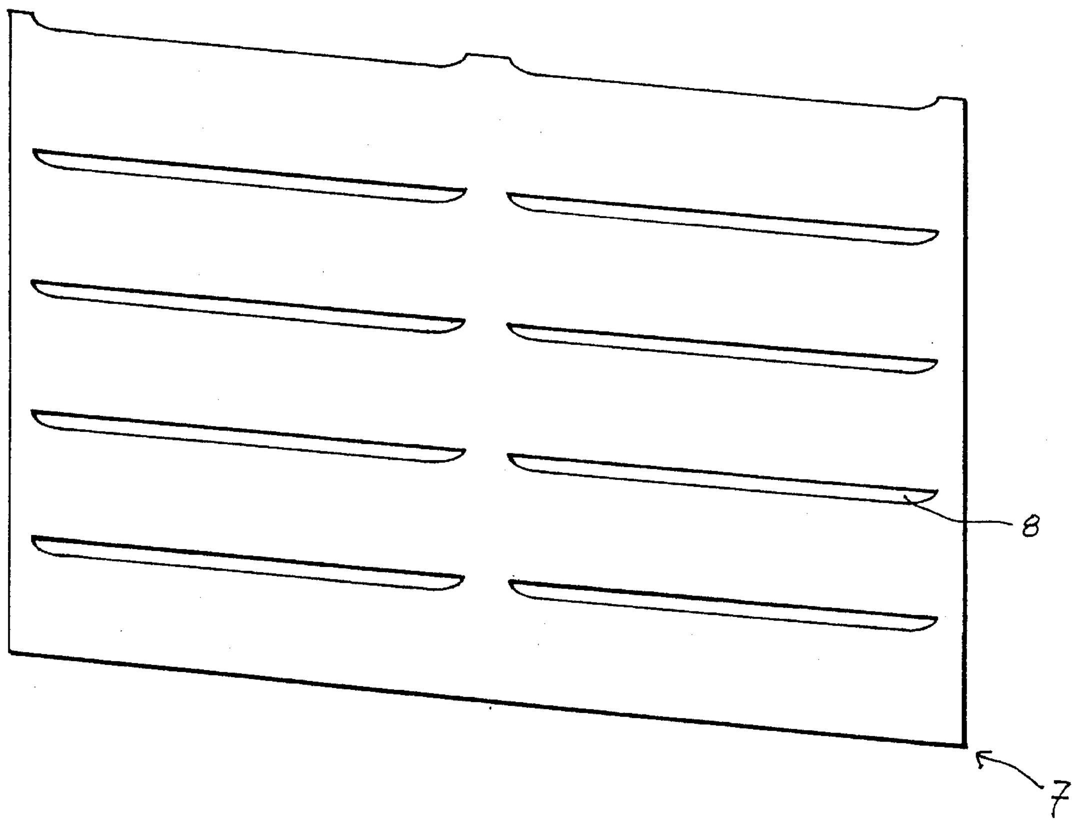
FIG. 2*a* is a front view of the die-cut plastic sheet without adhesive stripes and not attached to paperboard folder.
Figure 2B:
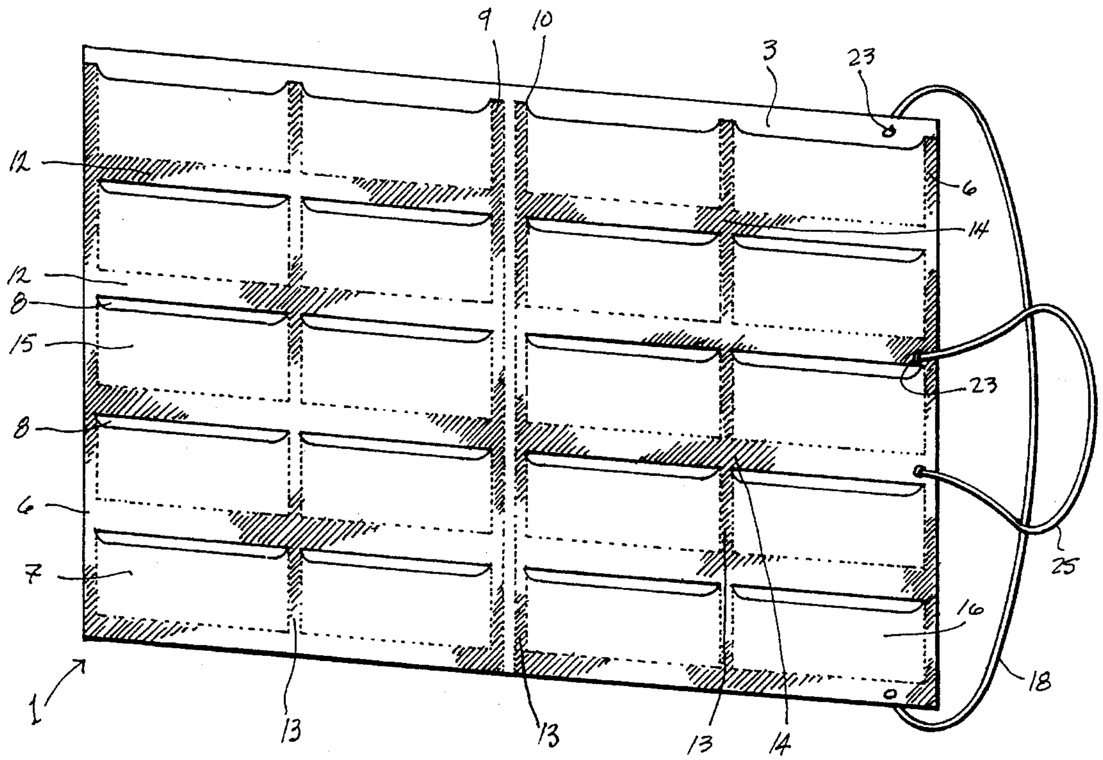
FIG. 2*b* is a front view of the preferred embodiment is a front view of the preferred embodiment wherein adhesive stripes are printed onto the bottom surface of a plastic sheet, and the sheet is applied to the interior surface of the folder and die-cut to create slots for the card-holding pockets.

FIG. 2*a* is a front view of the plastic sheet 7 with die-cut slots 8 but without adhesive stripes 6 and without attachment to folder 1. FIG. 2*b* is a direct front view of the interior surface 3 of the paperboard folder 1 in the preferred embodiment, when the leaves are at 180 degrees. In particular, this view illustrates the alignment of the adhesive stripes 6 applied to the lower surface of sheet 7 in the preferred embodiment. These stripes 6 form a framework for the card pockets to be formed by a sheet of frosted vinyl or other suitable material 7. A first set of adhesive stripes 12 are printed on the lower surface of the flexible sheet 7 contiguously and horizontally, with each stripe 12 spaced in a parallel fashion, and approximately equidistant from remaining stripes 12.

The vertically aligned second set of stripes 13 intersect stripes 12 at right angles 14, when printed on the lower surface of sheet 7. They are simultaneously parallel to every other adhesive strip 13 at approximately equidistant intervals.

In this particular embodiment, the originally printed adhesive stripes 12 and 13 reveal horizontal rows of card carrying pockets 15 from left to right. Slots 8 allow insertion of business cards easily into each pocket 15, as well as allowing for easy removal. There is space 16 on each pocket 15 to write appropriate notes directly with a pencil or ballpoint pen. One can also see band 18 from this view as well as handle 25.

Figure 3:
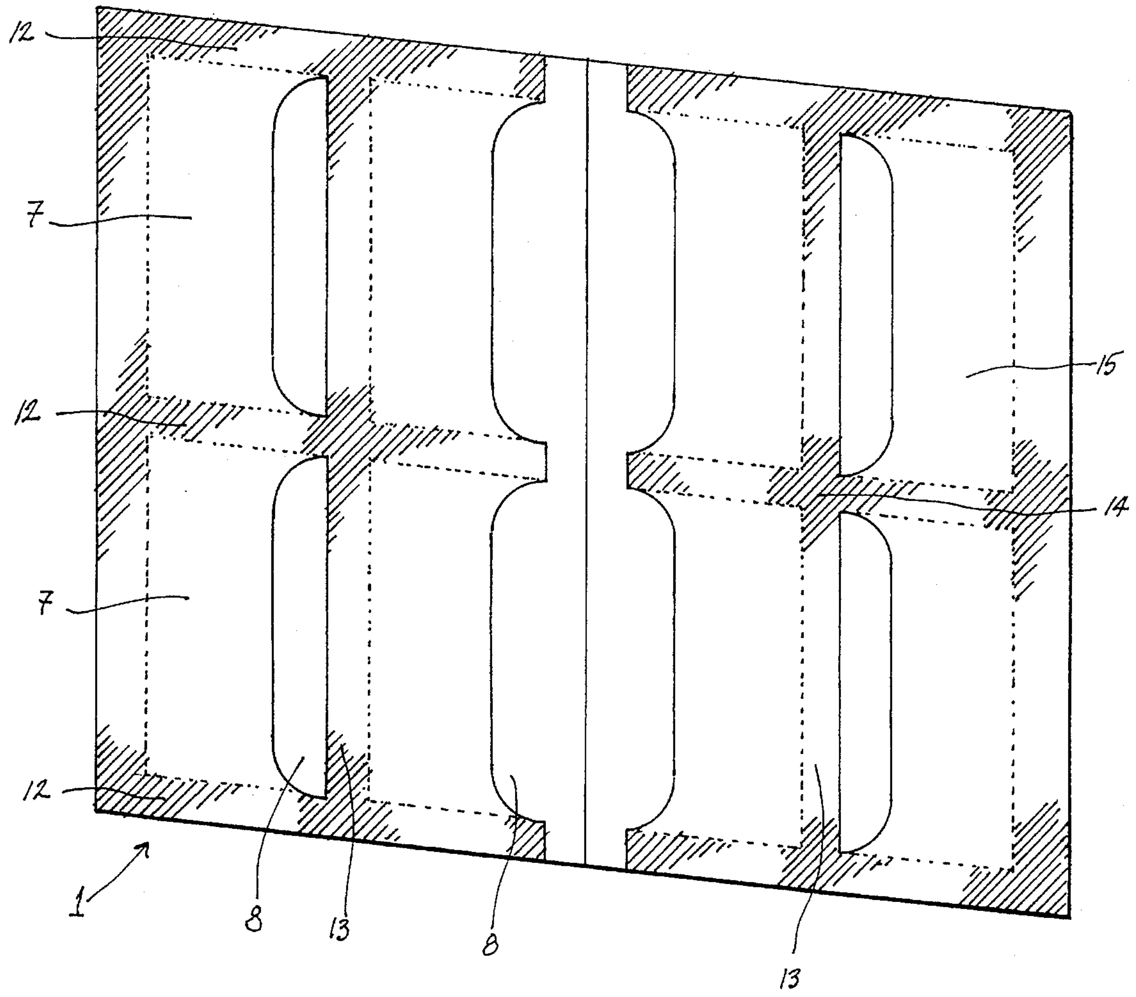
FIG. 3 is a front view of another embodiment of the card carrier wherein the adhesive stripes are again applied to the bottom surface of the flexible sheet, the sheet attached to the interior surface of the folder, and die-cut to create slots for the card-carrying pockets.

FIG. 3 illustrates a second embodiment of my card carrying invention using a smaller card folder 1. As in FIGS. 2*a* and 2*b*, the adhesive stripes 12 have been applied horizontally and parallel to each other on the lower surface of sheet 7. Similarly, vertical stripes 13 remain parallel to each other on lower surface of sheet 7 and intersect at right angles with stripes 12. FIG. 3 also illustrates the differences between the first and second embodiments after the plastic sheet 7 is applied smoothly to interior surface 3. In this embodiment the plastic sheet 7 is die-cut so that the slots and pockets are aligned in a vertical direction on interior surface 3. Accordingly, slots 8 are positioned in a vertical manner, and also become more rounded during the die cutting procedure.

The result in FIG. 3 is four rows of card holders, or pockets, for a total of eight available card holding pockets 15. Moreover, in this embodiment, although folder 1 is physically smaller in total interior area than the preferred embodiment, the actual card carrying pockets 15 are individually larger in area, thus accommodating customers who wish to easily place slightly larger cards in a smaller folder. As in the preferred embodiment, there is sufficient space 16 on the pockets 15 for the end-user to jot down notes with a pencil or ballpoint pen.

Figure 4:
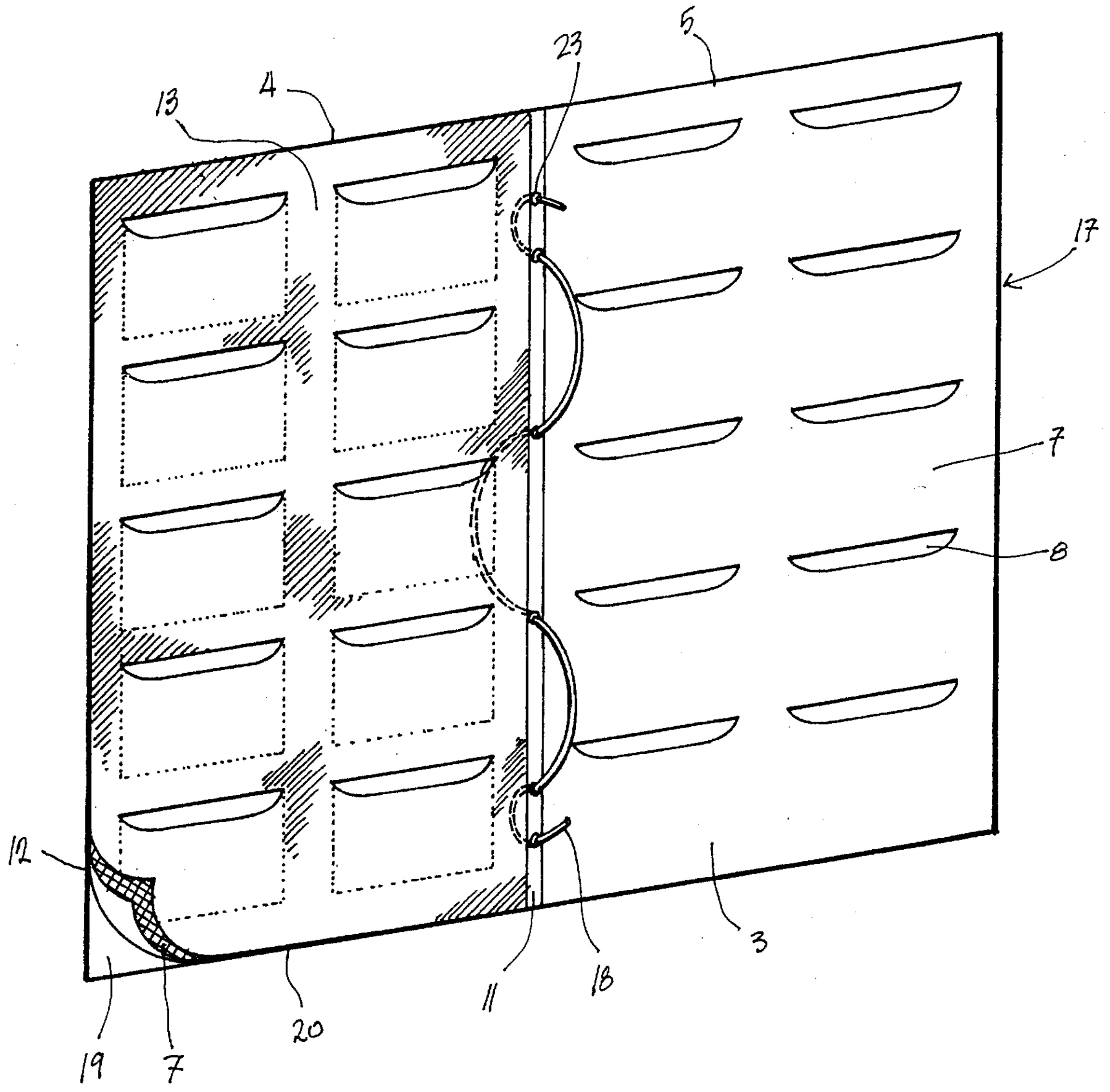
FIG. 4 is a partial front view of a restaurant menu comprised of two leaves, with pockets similar to those in FIGS. 2 and 3 for promoting menu specials on printed cards.

FIG. 4 illustrates the embodiment when card-carrying means are inserted into a conventional menu 17. In this illustration, the menu has two leaves 4 and 5 and the resulting folder is open exposing the interior surface 3 at approximately 120 degrees. The band 18 serves conventionally as a binding means to keep the pages of the menu together through prepunched holes 23, with or without eyelets. For the purposes of my invention, the restaurant menu is constructed of 6 to 12 point bleached white paperboard 19 with a polyester substrate laminating film and a copolymer adhesive backing 20, not seen from this view. In the preferred embodiment, the vinyl sheet 7 is typically 3.5 mil frosted calendared PVC vinyl.

For both the card carrying folder and restaurant menu, the back and front leaves., or covers, are of coated paperboard, but the inside surface is ordinarily not coated, being covered by vinyl plastic. In the preferred embodiment, another feature is an elastic band extending between the top and bottom corners of the covers. This band keeps the folder closed in a business card carrying capacity.

Figure 5:
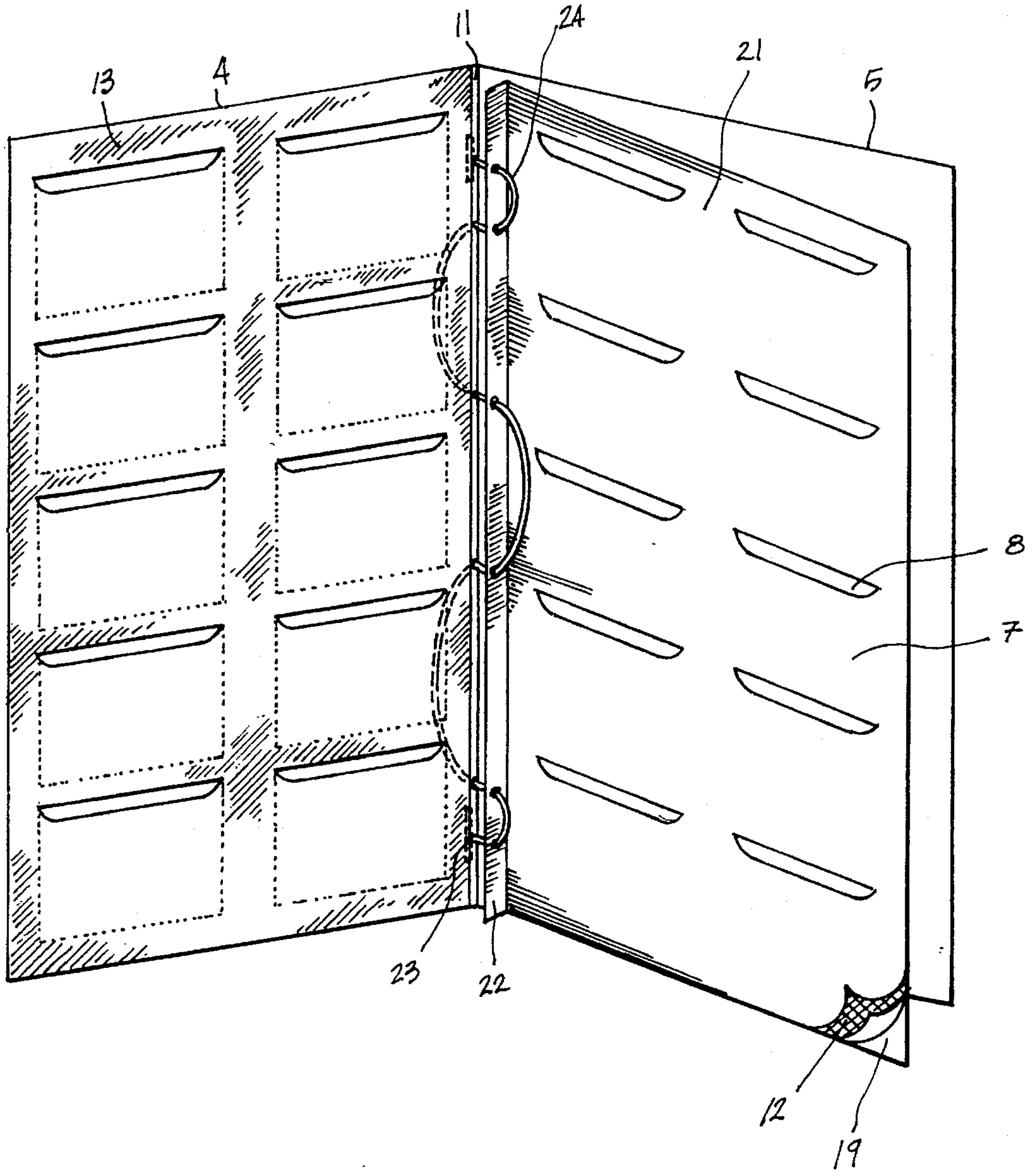
FIG. 5 is a front view of an open menu showing an additional interior leaf which can be attached to the menu with a band threaded through prepunched holes.

The exterior surface of the paperboard leaves may be printed. The paperboard, once any printing has been completed, is laminated on the exterior (not seen) with polyester substrate laminating film, and with an approximately 3/16" overlapping sealed edge. Referring to FIG. 5, if a section of paperboard with pockets will be a leaf 21 for a menu, then one side has a ¾ overlapping sealed edge 22. This edge 22 provides for hole punches with or without eyelets 23, to bind leaf 21 to the menu, using the band 24 woven through holes with or without eyelets punched in the menu's spine 11 and the edge 22. This arrangement further provides alignment with the original menu covers, as well as other inserts and pages.

To produce the menu as the preferred embodiment, the blank unprinted and laminated side of the paperboard 3 is applied with a frosted, calendared sheet of PVC vinyl 7. Stripes 12,13 of approximately ⅜" wide acrylic pressure sensitive adhesive are printed onto the lower surface of sheet 7 at various points and edges, as with the previous embodiments. These adhesive stripes printed on the lower surface of the sheet 7, will ultimately form the three sided pockets 15.

Once the 3.5 mil vinyl is placed smoothly over the laminated paperboard, then there is die-cutting of the slots 8 in the areas where the intended pockets for "food specials" cards will appear. A scoring and hole punching operation also occurs during the same die-cutting stage, so that the 3/16" thick and round colored elastic band 24 interweaving through the pre-punched holes, with or without eyelets, can assemble all menu pages. In this approach, a plurality of holes, with or without eyelets, are punched along the spine 11 of a laminated sheet of paperboard. However, the embodiment of my restaurant menu also contemplates that a plurality of such leaves containing pockets as herein described are within the scope of my invention when attached to a single menu.

The crucial improvements of my invention in all its embodiments embrace the difference in the combination of materials and bonding method of these materials. For example, the vinyl sheet printed with a suitable adhesive and bonded to laminated paperboard is a significant change from vinyl heat-sealed to vinyl. The sizes of paperboard are generally, in the preferred embodiment: (1) 18"×16" scored center twice ¼" apart. However, measurements of 17"×11" scored center twice, ¼" apart are also appropriate. In the case of my menu embodiment, the folder or menu is creased medially or longitudinally to form a spine. These particular sizes will support a configuration of 4 columns and either 4 to 7 rows of pockets to be determined by the two sizes. For food specials recommended card dimensions are generally 8"×5" or 3½"×2" but can always be determined by the restaurateur's desires.

However, these recommendations do not limit the scope of my invention. In fact, other dimensions will also suffice and many methods of silkscreening, other printing methods, empirically suitable adhesives, sheet materials, and grades of paperboard can be varied without departing from the scope of my invention. As an example, in an alternative construction method, one can use 3.5 mil to 6 mil clear vinyl plastic having a special non-stick coating in lieu of frosted vinyl plastic. The configuration of number of rows and columns might be altered to increase or reduce the number and quantity of "food specials" cards. One can also alter the width and length of the adhesive stripes, or the intervals between these stripes, to open or reduce the card pocket sizes, or even to more easily accommodate the weight of the cards within the pockets.

In addition, the sizes of paperboard can be 11"×17", scored centered once, and 11"×17¼" scored center twice, ¼", to form a bookend edge. These two sizes will support a configuration of four columns of either 4 rows or 5 rows of pockets. Other possible paperboard sizes are 8½"×11" or 8½×14", both scored centrally to form a "tent fold" and a configuration of two columns and 4 rows, or 2 columns and 6 rows of pockets, respectively.

In the preferred embodiment of my invention, the shape of the pockets 15 are generally rectangular, although in some embodiments the fourth side comprising the slot 8 may be more rounded. However, there can be any modifications and size of this particular shape. As already emphasized, the materials specified for the preferred embodiment of my invention can be interchanged with other suitable sheets, paperboard, other suitable adhesives and flexible bands without departing from the spirit and scope of my invention described herein.

What I claim is:

1. A method for constructing a folder comprising front and back leaves, a frosted vinyl sheet and adhesive, said leaves each having an exterior and interior surface, said method comprising the steps of:

a. coating said exterior surface of said leaves, b. printing stripes of pressure sensitive adhesive on said vinyl sheet, said sheet having an upper and lower surface, said stripes printed on said lower surface, c. pressing said lower surface of said sheet smoothly upon said interior surface of said leaves, d. die cutting said sheet to produce slits, thereby providing three sided pockets within said folder.

2. The method as described in claim 1 wherein (a) a first flexible band is attached to said leaves through prepunched holes, to bind pieces of paper to said folder, and (b) a second flexible band is attached to said folder to form a handle when said folder is in a closed position.

3. A method for constructing a folder comprising front and back leaves, a frosted vinyl sheet and an adhesive, said leaves each having an exterior and interior surface, said method comprising the steps of:

a. lithographing said exterior surfaces of said leaves, b. printing stripes of pressure sensitive adhesive on said sheet, said sheet having an upper and lower surface, said stripes printed on said lower surface, c. Pressing said lower surface smoothly upon said interior surface of said leaves, d. die cutting said sheet to produce slits, Thereby producing three-sided pockets within said folder.

4. The method as described in claim 3 wherein (a) a first flexible band is attached to said leaves through prepunched holes to bind pieces of paper to said folder, and (b) a second flexible band is attached to said folder to form a handle when said folder is in a closed position.

5. The method as described in claim 3 wherein said adhesive is acrylate based, screen printable, ultraviolet light resistant, pressure sensitive, and has a temperature range stability of between approximately 22 degrees F.(−5 degrees C.) and 212 degrees F.(100 degrees C.).

* * * * *